(12) United States Patent
Hotellier et al.

(10) Patent No.: US 6,864,310 B2
(45) Date of Patent: Mar. 8, 2005

(54) PROCESS FOR MANUFACTURING A TIRE COMPOUND

(75) Inventors: Gianluigi Hotellier, Milan (IT); Antonio Proni, Lodi (IT)

(73) Assignee: Pirelli Pneumatici S.p.A., Milan (IT)

( * ) Notice: Subject to any disclaimer, the term of this patent is extended or adjusted under 35 U.S.C. 154(b) by 479 days.

(21) Appl. No.: 09/966,115

(22) Filed: Oct. 1, 2001

(65) Prior Publication Data

US 2002/0068774 A1 Jun. 6, 2002

Related U.S. Application Data (63) Continuation of application No. PCT/EP00/02665, filed on Mar. 27, 2000
(60) Provisional application No. 60/134,665, filed on May 18, 1999.

(30) Foreign Application Priority Data

Apr. 1, 1999 (EP) .............................................. 99830189

(51) Int. Cl.$^7$ ................................................. C08K 3/34
(52) U.S. Cl. ........................ 524/492; 524/495; 523/216
(58) Field of Search ................................. 524/492, 495

(56) References Cited

U.S. PATENT DOCUMENTS

| | | | |
|---|---|---|---|
| 4,455,091 A | | 6/1984 | Bamberger et al. |
| 5,090,464 A | * | 2/1992 | Kauzlarich et al. ......... 152/310 |
| 5,227,425 A | | 7/1993 | Rauline |
| 5,804,636 A | | 9/1998 | Nahmias et al. |
| 5,916,951 A | | 6/1999 | Nahmias et al. |
| 6,136,913 A | | 10/2000 | Nahmias et al. |

FOREIGN PATENT DOCUMENTS

| | | |
|---|---|---|
| EP | 0 244 121 A1 | 11/1987 |
| EP | 0 728 803 A1 | 8/1996 |
| EP | 0 736 558 A1 | 3/1997 |

OTHER PUBLICATIONS

Wolff et al.; "Silica–Based Tread Compounds: Background and Performance"; Tyretech '93, Conference, Basel / Switzerland, published by Degussa, (1993).

* cited by examiner

*Primary Examiner*—Edward J. Cain
(74) *Attorney, Agent, or Firm*—Finnegan, Henderson, Farabow, Garrett & Dunner, L.L.P.

(57) ABSTRACT

A process for manufacturing a composition of matter from components includes combining the components to produce a blend and combining the blend with a crosslinking system to produce the composition. The components include a polymer base, a silica reinforcing filler, a silica-binding agent, and further product and process additives. Combining the components is carried out in a closed mixer comprising a piston and a pair of rotors. While combining the components, values of at least two indirect parameters and at least two direct parameters are measured at least every two minutes. The at least two indirect parameters comprise blend temperature and power absorbed by the rotors. The at least two direct parameters comprise pressure exerted by the piston and rotations of the rotors. The at least two indirect parameters are maintained within respective ranges of predetermined values by controlling one or more of the at least two direct parameters.

28 Claims, 2 Drawing Sheets

PROCESS FOR MANUFACTURING A TIRE COMPOUND

CROSS-REFERENCES TO RELATED APPLICATIONS

This application is a continuation of International Patent Application No. PCT/EP00/02665, filed Mar. 27, 2000, in the European Patent Office; additionally, Applicants claim the right of priority under 35 U.S.C. § 119(a)–(d) based on patent application No. 99830189.9, filed Apr. 1, 1999, in the European Patent Office; further, Applicants claim the benefit under 35 U.S.C. § 119(e) based on prior-filed, provisional application No. 60/134,665, filed May 18, 1999, now abandoned, in the U.S. Patent and Trademark Office; the contents of all of which are relied upon and incorporated herein by reference.

BACKGROUND OF THE INVENTION

1. Field of the Invention

The present invention relates to a process for producing a rubber compound charged with silica and more particularly to a method for controlling the process parameters during the mechanical processing of this compound in a closed batch mixer.

2. Description of the Related Art

Hereinbelow, the expression "closed batch mixer" is intended to denote a device comprising a closed container inside which is housed a pair of rotors rotating in opposite directions, to mix the various ingredients of a compound. The device further comprises a pneumatic cylinder located at the top of the container, the piston of which is driven either upwards to open the container and allow the introduction of the ingredients of the compound from suitable filling hoppers, or downwards to exert a pressure on the material being processed in the container, above the pair of rotors.

A pneumatic system placed at the bottom of the container allows the compound to be emptied out at the end of the processing cycle, via the opening of a suitable outlet.

Devices of the type mentioned above have been known for some time: in particular, there are devices of the "Banbury®" type which process the material by means of a pair of tangential rotors, while different devices known under the name "Intermix®" process the material by means of a pair of intermeshing rotors.

A rubber compound which can be prepared by the process of the invention is of the type comprising an unsaturated-chain polymer base which can be hot-crosslinked with sulphur, which are added to at least one silica filler and a silica-binding agent containing at least one sulphur atom.

In the description hereinbelow and in the claims, the term "crosslinkable unsaturated-chain polymer base" is intended to denote any natural or synthetic, non-crosslinked polymer, or mixture of polymers, capable of acquiring all the typical physicochemical and mechanical properties of elastomers after crosslinking (vulcanization) with sulphur-based systems.

In the description hereinbelow and in the subsequent claims, the term "silica-based reinforcing filler" is intended to denote a reinforcing agent based on silicon dioxide (silica), silicates and mixtures thereof, with a surface area, measured by the BET method, of between 80 and 220 $m^2/g$, preferably between 160 and 180 $m^2/g$.

As is known, compounds reinforced with silica fillers are especially used in the production of semi-finished rubbers for tyres, in particular tread bands, since these compounds allow a reduction in the tyre's resistance to rolling when the silica is chemically bonded to the polymer base following subsequent reactions with a binder made of a silane.

The present invention is based on the perception of the problem of the uniformity and reproducibility of the mechanical and rheometric properties of a compound produced for finite and sequential amounts, as being dependent on the values of certain process parameters, which can vary continuously during the process.

In general, it is thought that the difficulties in processing silica-charged compounds are based on the fact that good homogenization of the silica in the polymer would require energetic mechanical processing, with the consequent development of high temperatures, whereas the reaction of silane with the polymer and with silica should be carried out under more controlled temperatures so as not to initiate premature crosslinking of the silane.

Hereinbelow, the material being processed during the various compounding and cooling phases will be referred to as the blend, while the blend discharged at the end of the processing cycle, generally after also adding the vulcanizing system, will be referred to hereinbelow as the compound.

A general process for the mechanical processing of a rubber compound with silica and silane is given in the publication "Silica based tread compounds: Background and performances", page 14, Table IV, published by Degussa on the occasion of the Tyretech '96 conference held at Bâle on 28–29 Oct. 1993.

According to this process, the silica and the silane are simultaneously loaded into the compound being processed, which is blended while keeping the processing temperature below 160–165° C., in order to avoid premature crosslinking of the silane by exceeding this temperature.

U.S. Pat. No. 5,227,425 describes a process for producing tread bands obtained by mixing a polymer base with a high content of silica and addition of a silane. The polymer base is formed from a diene conjugated with a vinylaromatic compound: the diene has a content of vinyl groups of between 5% and 50%.

The polymer base and the silica are processed mechanically in a closed batch mixer, or in an extruder, until a temperature of at least 130° C. is reached, and preferably between 145° C. and 180° C., but not exceeding 180° C.

According to another process, the polymer and the silica are subjected to mechanical processing in two separate phases separated by a cooling phase.

In the first phase of this latter process, the polymer base, the silica and the binder are subjected to mechanical processing until a temperature of greater than 145° C. is reached, preferably between 145 and 170° C.

After removing this blend from the mixer, it is cooled to a temperature below 100° C. and preferably not above 60° C.; this is then followed by a second phase of mechanical processing in a batch mixer together with other ingredients, excluding the vulcanization agents, until a temperature of between 145 and 170° C. is again reached.

The vulcanizing system is then added to the blend by means of a final phase of mechanical processing, in an open two-cylinder mixer, at a temperature below 100° C.

Italian patent application No. 95IT-MI000359A from the Applicant describes a process in which, for the purpose of improving the dispersion of the silica in the polymer base, the polymer base is first mixed with the silica in a closed batch mixer until a temperature of between 165° and 180° is reached, after which the blend is cooled to room temperature.

In a second phase, the silane is added and the blend is subjected to further intimate mixing, in a closed batch mixer, until a temperature of 135° C. is reached; the blend is then cooled again to room temperature.

In a final phase, the ingredients of the vulcanizing system are added and further mixing is carried out in a closed batch mixer, without exceeding a temperature of 110° C.

It should be noted that the final properties of a ready-to-use compound, and consequently the quality of the finished product, depend not only on its formula, but also, to a large extent, on the consistency of the properties of the ingredients used, which can vary from one batch to another, and on the consistency of the particular processing carried out, identified by the process parameter values, which can themselves vary randomly during processing of the blend.

For this reason, a high-quality compound produced by processes which use batch mixers is obtained by first producing a test compound and checking the properties of a number of samples of the said compound after vulcanization and then, in the event of one or more of these properties being unacceptable, correcting the values of the various process parameters as and when necessary by trial and error, until the desired result is achieved.

After the values of the various process parameters have been preset in the abovementioned manner, the consistency of the properties of the compound produced, which is necessary in order to ensure that the product has the desired requirements, is ensured by carrying out repeated checks on the properties both of the blend and of the final compound.

From the Applicant's point of view, the problem to be solved is now that of ensuring the reproducibility of the properties of the approved compound, for all the identical compounds subsequently produced, batch after batch.

Currently, before approving the compound for subsequent use and authorizing the production of a new batch, a range of checks on the mixture's physicomechanical properties are carried out; this involves long waiting times before the results of the tests are known and the risk of having produced large amounts of unsuitable material, which will have to be discarded, before being able to ascertain this unsuitability.

In particular, evaluation of the correct result for the processing as regards compounds comprising silica and silane requires a large number of controls on both the raw and vulcanized compound.

The reason for this, it should be observed, is that in order to be able to be used in a tyre, the final compound needs to show a uniform dispersion of the silica filler in the polymer base, which can be obtained during the processing of the blend in the batch mixer, and needs to have undergone a correct chemical reaction between the silica and the silane.

The quality and variability of the product which is vulcanized, with the silica-charged compounds and for each specific compound formulation, depends substantially on the embodiment of these process phases, which are respectively referred to hereinbelow by the terms "silicization" and "silanization", which cannot be encountered in the processing of other polymers to which are added various ingredients and reinforcing fillers other than silica, for example conventional carbon black fillers.

By carrying out systematic checks on the compounds, it has been found that the compound properties considered acceptable can be within a wide range of values; in essence, a wide variability of these values has been encountered, such that it is possible for two compounds, nominally identical but manufactured one after the other, though performing satisfactorily in use, nevertheless to have properties that are very different from each other.

It should furthermore be noted that the fundamental requirement for tyres of each particular type is the reproducibility of the performance characteristics. Purely by way of example, the market specifically asks for tyres with uniform "handling" performance characteristics, which depends to a large extent on the slip force developed by the tyre.

The slip force depends, among other things, on the dynamic modulus of the tread compound, the value of which is greatly influenced by the variability of the process parameters which control the abovementioned phases of "silicization" and "silanization", respectively.

Unfortunately, as has been stated, the process of the prior art, based on post-checking of the compounds produced, does not make it possible to achieve, as would be desired, in particular for the compounds towards which the present invention is specifically directed, high uniformity of performance characteristics between products incorporating these compounds, manufactured one after the other, unless there is a narrowing of the accepted tolerance range, and thus an increased selection of the compounds produced.

SUMMARY OF THE INVENTION

The Applicant has found that it is possible to avoid having to systematically check the acceptability of the blends, and to reduce the number of tests on the compound, while simultaneously reducing the variability of properties between the vulcanized products incorporating these compounds, by solving the problem upstream, that is to say by guaranteeing the quality of the raw compound by means of continuously controlling the blend processing process.

In a first approach to the problem, the Applicant felt that the solution might be found in defining an optimum profile of the power absorbed and of the temperatures developed by the blend during its processing, in particular in the phases of "silicization" and "silanization", and in keeping the said profile within preset limits by controlling the mechanical power given to the blend, in order to control the temperature reached by the blend.

However, it was subsequently observed that controlling the mechanical power absorbed from the mixer was not able alone to solve the problem since, on account of the thermal inertia of the blend and of the temperature measuring system, it was not possible to have a precise indication, in real time, as to how much the temperature had actually changed as a result of a programmed variation in the mechanical power given to the blend, with the risk that the blend might remain for a certain time subjected to temperature values not suitable for the processing cycle taking place.

For example, an increase in the mechanical power given to the blend at a precise moment and for a preset period, although giving rise to an increase in temperature which was desired and necessary in that particular phase of processing of the blend, did not exclude the possibility that the abovementioned variation in temperature over this certain period of time might have been too large, leading to temperature values which were unacceptable in the subsequent phases of processing of the blend.

Moreover, mere observation of the temperature variations, although constituting proof that a variation in the mechanical power absorbed by the mixer had taken place, did not, however, make it possible to assess the exact value; the consequence of this is that the entire processing cycle might have included, needless, unwanted and in some cases excessive energy consumptions.

Thus, the problem remained of how to vary the temperature of the blend sufficiently quickly, in addition to the variations in power transferred, to adjust it moment by moment to the optimum processing conditions.

The Applicant has observed that the solution to the problem can be found by carrying out a simultaneous and constant check over time of the main values involved during the cycle of processing of the blend in the closed mixer, i.e. the mechanical power absorbed, governed by the number of rotations of the rotors, and the temperature developed by the blend, together with the fact of using the movements of the piston in the cylinder present on the mixer hopper in order to continually adjust, by means of varying the pressure exerted on the blend, the temperature values to the requirements of the preset production cycle in order to obtain a uniform dispersion of the silica in the blend and a smooth chemical reaction between the polymer, the silica and the silane.

In a first aspect, the invention relates to a process for manufacturing a tyre compound comprising as a minimum a polymer base, a silica reinforcing filler, a silica-binding agent and further product and process additives, the said process comprising at least a first phase of processing the said ingredients to produce a blend and at least a second phase of processing the said ingredients to add a crosslinking system to the said blend and produce the said compound, at least the said first processing phase being carried out in a closed mixer comprising a container inside which rotates a pair of rotors, a hopper for introducing the said ingredients, a piston located above the said container which can move to and from the said pair of rotors to press the said ingredients between the rotors, and an outlet below the said container for discharging the said blend, the said process being identified by at least two indirect process parameters, namely the power absorbed by the said pair of rotors and the temperature of the said blend, and by at least two direct process parameters, namely the number of rotations of the said pair of rotors and the pressure exerted by the said piston, the said process comprising the phases of:

checking, during the manufacturing cycle, at least the values of the said two indirect process parameters, with an interval between two successive checks which is not greater than two minutes, controlling the variable change of the said values by means of varying at least one of the said direct process parameters, so as to keep the values of each of the said indirect parameters within their respective ranges of predetermined values.

In particular, the process is specifically used for the manufacture of compounds comprising at least the following ingredients, in variable amounts, per one hundred parts by weight (phr) of polymer base, between the following limits:

| Polymer base | 100 |
| Carbon black | 0–80 |
| Silica | 10–80 |
| Silica-binding agent | 4%–15% of the silica |
| Zinc oxide (ZnO) | 1–3 |
| Stearic acid | 0–3 |
| Anti-deteriorating agents | 1–3 |
| Plasticizing oil | 0–30 |
| Anti-ozone wax | 0.5–3 |
| Specific chemical ingredients | 0–15 |

In accordance with this aspect of the invention, the ranges of values for the said process parameters are predetermined in relation to each specific compound to be produced.

The method for predetermining the said ranges of values preferably comprises at least the following phases:

a) determining, in a specific reference compound, the average values and the related tolerance range for the said values for a plurality of properties both for the particular blend and for the compound, before and after vulcanization;

b) producing a sample compound using selected initial process parameters;

c) comparing the values of each of the said properties measured in the said sample compound with the corresponding values of the said reference compound;

d) modifying at least one of the said initial process parameters in relation to the values measured in the said sample compound which may be outside the said tolerance ranges;

e) repeating phases b), c) and d) until all the values for the said properties measured in the said sample compound are within the said predetermined ranges of values;

f) setting, as process parameters for each specific compound to be produced, the average values and the variability range of the said process parameters which generate values of the said properties measured in the said sample compound which are within the said predetermined ranges of values.

The process preferably involves checking the viscosity values and the percentage of silane reacted with silica, in the blend of the sample compound, free of crosslinking system. The viscosity values and the percentage of silane reacted with silica are preferably also checked in the sample compound, before vulcanization, together with the values of certain rheometric properties.

Lastly, the density values and the values of a number of dynamometric properties, such as hardness, elastic modulus, breaking load and elongation, are preferably checked on the sample compound after vulcanization.

In a preferred embodiment of the process, the said first phase of processing the said ingredients comprises a phase of silicization followed by a phase of silanization, the said silicization phase being carried out at a substantially increasing temperature, the said silanization phase being carried out at a substantially constant temperature and, more preferably, in combination or alternatively, with the speed of rotation of the said rotors substantially constant.

Even more preferably, the said silicization phase comprises at least three processing cycles carried out at different rotation speeds of the said rotors, with the said rotation speeds gradually decreasing, and with the said substantially increasing temperature produced by means of at least three peaks of supplied power.

The said power peaks are preferably obtained by lowering the said piston towards the pair of rotors.

In a different aspect, the invention relates to a rubber compound for tyres comprising at least the following ingredients, in variable amounts, per one hundred parts by weight (phr) of polymer base, between the following limits:

| Polymer base | 100 |
| Carbon black | 0–80 |
| Silica | 10–80 |
| Silica-binding agent | 4%–15% of the silica |
| Zinc oxide (ZnO) | 1–3 |
| Stearic acid | 0–3 |
| Anti-deteriorating agents | 1–3 |

-continued

| | |
|---|---|
| Plasticizing oil | 0–30 |
| Anti-ozone wax | 0.5–3 |
| Specific chemical ingredients | 0–15 | which is characterized in that it is manufactured by the process described above according to the invention. In yet another aspect, the invention relates to a tyre for vehicle wheels which is provided with a tread band made of a rubber compound comprising a silica filler in an amount of between 40 and 80 parts by weight per 100 parts by weight of the polymer base and a silica-binding agent in an amount of between 4% and 15% of the silica filler, characterized in that the said rubber compound is produced by the process of the invention.

BRIEF DESCRIPTION OF THE DRAWINGS

In any case, a better understanding of the present invention will be gained with the aid of the description which follows and the attached figures, which are given for purely illustrative and non-limiting purposes, in which.

DETAILED DESCRIPTION OF THE PREFERRED EMBODIMENTS

Figure 1:
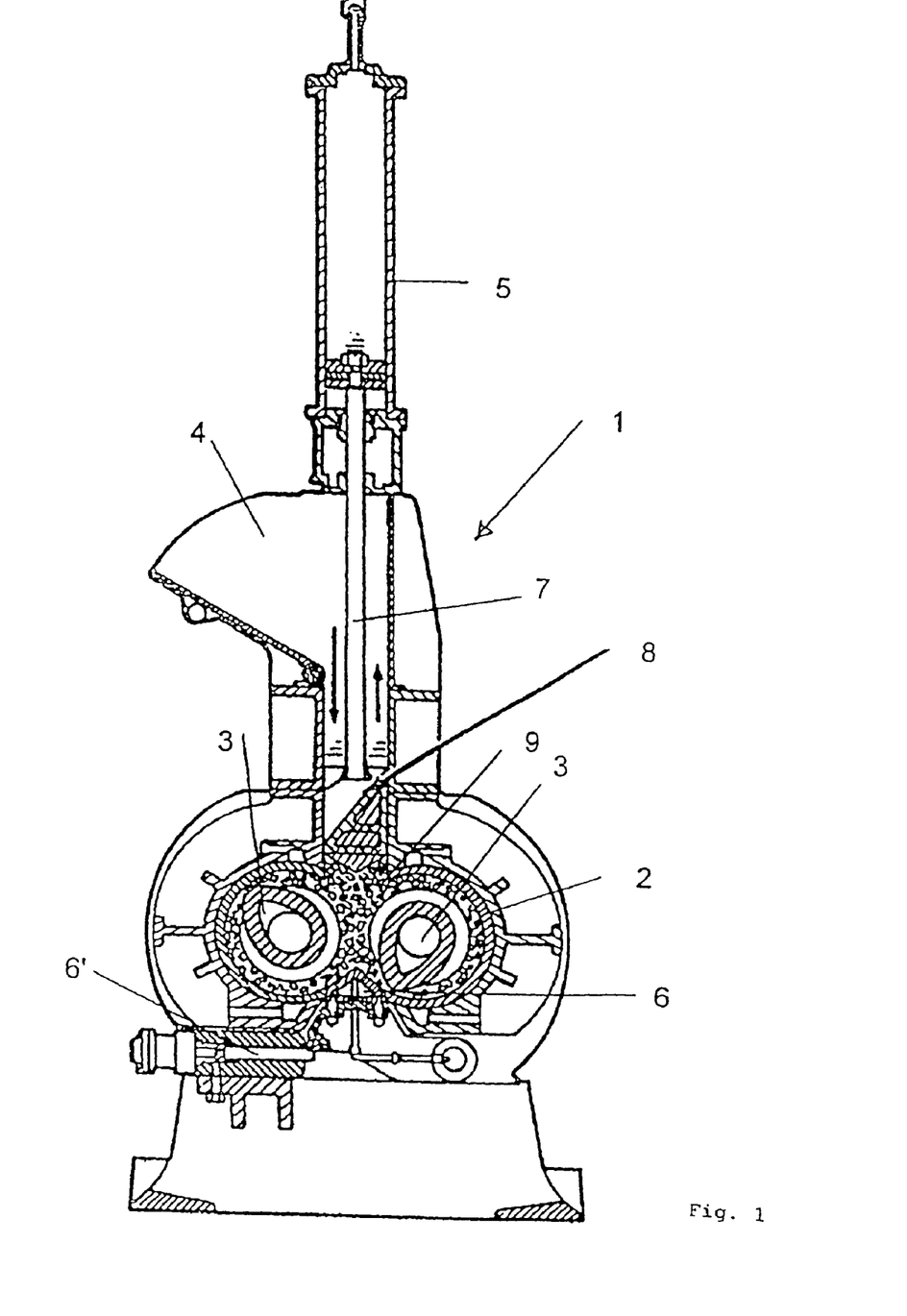
FIG. 1 is a schematic representation of a known closed batch mixer, with tangential-type rotors, to carry out the process for manufacturing compounds according to the invention.

The device 1 comprises a stainless steel container 2, inside which rotates a pair of rotors 3 each in the shape of a broken spiral (not illustrated) rotating in opposite directions to each other, a loading hopper 4, a pneumatic or hydraulic cylinder 5 placed at the top of the container, a discharge outlet closed off by a closure member 6 and placed at the bottom of the container, and a device 6' for actuating the closure member in order to open and close the outlet.

The cylinder 5 in turn comprises a piston, which moves axially relative to the cylinder and consists of a piston rod 7 ending with a head 8 designed to close off the working chamber after introduction of the various ingredients and to keep the process blend 9 pressed between the rotors and the container.

The pressure exerted by the piston on the blend being processed between the rotors can be controlled by varying the stroke of the piston relative to the cylinder, that is to say the position of the head relative to the container, and expressed in terms of the said stroke or the said position, or alternatively by directly varying the value of the specific pressure exerted by the piston on the material being processed, by means of the system (for example the hydraulic or pneumatic system) for actuating the piston.

The process for the mechanical processing of the materials introduced into the mixer 1 will now be described with reference to the curves in FIG. 2 which relate to a hypothetical compound formulation and are thus exclusively qualitative in nature, purely for the purpose of illustration: it is clear that each specific compound formulation can have its own reference diagram.

Figure 2:
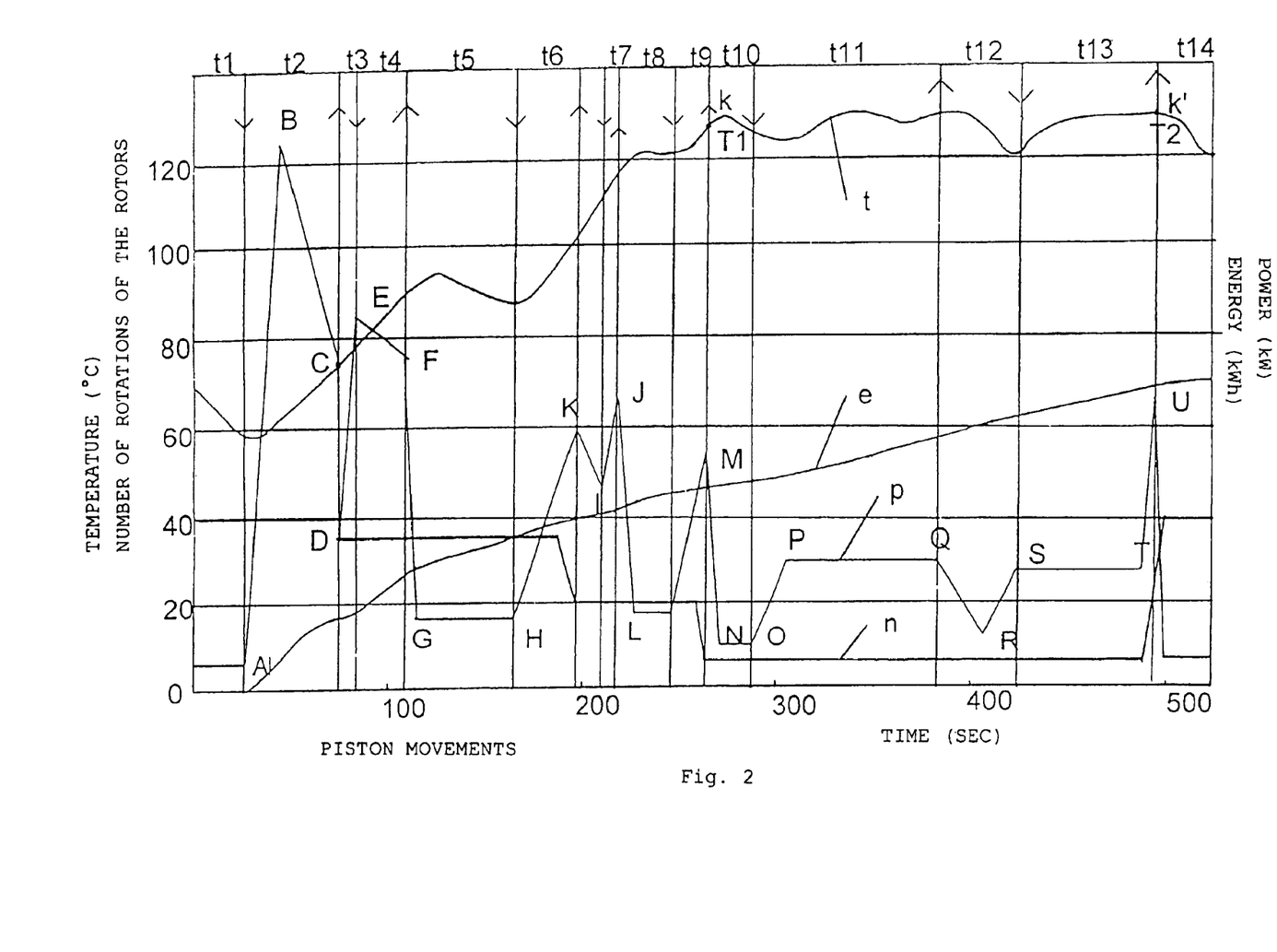
FIG. 2 shows, in a Cartesian diagram, the variations in the values of the main process parameters during a production cycle inside the mixer in FIG. 1.

FIG. 2 illustrates the main direct and indirect process parameters, against time, in the course of a working cycle, and specifically the curve "n" of the number of rotations of the pair of rotors, the curve "p" of the mechanical power absorbed by the blend during the working cycle, the curve "t" of the temperature of the blend inside the device, the curve "e" relating to the energy consumed during the working cycle, together with the sequence of reciprocating movements of the pressing piston.

In the graph in FIG. 2 the left-hand y-axis shows the temperatures and the number of rotations of the pair of rotors, the right-hand axis shows the power and energy; the bottom x-axis show the total cycle time, measured in seconds, and the top axis shows the partial times between the successive movements of the pressing piston.

The power is expressed in kW, the rotations of the rotors are expressed in revolutions per minute and the temperatures are given in degrees Centigrade: normal standard thermocouples can be used to measure the temperature, for example ordinary thermocouples made of iron-Constantan bimetal. The thermocouples are placed inside the container, mounted on the shoulders and/or on the apex of the closure member for the discharge outlet.

The temperature values are controlled continuously during the processing: the actual temperature values of the blend during processing, relative to those read by the thermocouples, may need to be increased by 5 to 20° C. depending on the processing phase and the thermocouples used.

The energy is determined by the integral of the power curve as a function of time: the integrating instrument is fitted to the mixer motors.

The indirect process parameters, such as the power absorbed by the pair of rotors and the temperature of the blend, are checked during the processing phase according to a predetermined time sequence with an interval between two successive checks which is generally not more than two minutes, preferably not more than 30 seconds and even more preferably not more than 15 seconds, so as to be able to correct, in real time, any variations thereof within the limits of the allowed tolerance ranges.

This frequency is determined on the basis of the type of compound which it is desired to prepare, since it is substantially influenced by the thermal inertia of the blend undergoing processing: by way of example, it is noted that for specific types of high-speed compounds, the said optimum interval for checking the blend proved to be about one second.

Whenever necessary or suitable, these indirect process parameters are checked at even shorter intervals, less than one second, during the separate processing phases mentioned above, so as to minimize deviation of the values for the said parameters away from the average preset value.

The data relating to the process values measured by the instruments mentioned above are plotted, as shown in FIG. 2, using any commercially available instrument of known type.

As a non-limiting guide, the instrument known as "Registratore Videografico RSX Progeny" [RSX Progeny Videographic Recorder] sold by Leeds+Northrup was used to plot the curves in FIG. 2.

This device is used to record the curves in FIG. 2 on paper, as well as for the management, recording and display of the process curves and data.

At the start of the working cycle, the piston is raised fully to allow the introduction into the mixer of a charge of material comprising, as a minimum, a polymer or a mixture of polymers, a silica filler and a silica-binding agent. The amount of material charged depends on the volume of the mixer, and in this case is preferably between 220 and 250 kg, and the charging time ($t_1$) is about 25 seconds.

As is seen in the diagram in FIG. 2, during this period the curve of the mechanical power absorbed shows a minimum value due to the fact that the pair of rotors, already rotating at a high and constant number of revolutions (e.g.: 40), has not yet started the mechanical processing of the materials; in this section, the curve relating to the temperature shows a decrease due to the fact that the thermocouples measure the temperature inside the container, which is cooling down after the previous discharge of blend and the subsequent introduction of fresh material at room temperature.

All of the silica can be introduced at the start of the processing cycle or, preferably, in at least two separate phases of the abovementioned cycle.

The material introduced into the device and discharged from the mixer at the end of the cycle will be defined altogether hereinbelow by the term "blend".

Once the material has been loaded in, the piston is lowered to compress the material inside the container; here and in the rest of the description, the movements of the piston are always considered as instantaneous, and are represented graphically in FIG. 2 by straight lines parallel to the y-axis, with an arrow indicating the direction of movement, closure being towards the x-axis. Following this lowering, the mechanical power absorbed increases rapidly (A–B) until it reaches a peak value (B) since the rotors, which are kept rotating at constant speed, exert the maximum force to break up and mix together the components of the blend, which still have high viscosity values, and also the temperature starts to increase. Subsequently, as mixing and the temperature increase proceed, the viscosity reduces, as does the power absorption, which falls to lower values (B–C), reaching the value C at the end of period $t_2$ (about 40–50 s).

At this point, preferably, the number of rotations of the rotors undergoes a first decrease (by about 10%) and the piston is simultaneously raised, such that the power absorbed falls to the value D: however, after a few moments, the piston once again moves down ($t_3$), bringing about a new peak E of absorbed power, after which the value falls once again (during $t_4$) down to F owing to the gradual decrease in viscosity, which is also associated with the continuous increase in temperature which reaches a value of about 90° C.

The raising of the piston also has the effect of propelling towards the rotors those portions of charge which, after escaping the blend in the form of powders between the body of the piston and the walls of the container, have accumulated on the closing surface of the device. The various percentages of the components of the blend are thus returned to the predetermined values, which is an essential premise for achieving the final properties of the blend.

The operation for managing the processing of the blend by means of the piston, according to one characteristic of the invention, makes it possible to control the change of the temperature over time within desired and necessary values for correct formation of the final product.

In point of fact, by reducing the pressure on the material being processed, raising the piston graduates the increase in the temperature with a predetermined gradient and has the effect of keeping this parameter within acceptable values, so as not to negatively affect the properties of the blend being processed.

In parallel, variation of the number of rotations of the rotors is used both for the purpose of optimizing the mechanical processing and for controlling the temperature.

The total working time from the start of the cycle up to the point F, for silica-charged compounds, can be between 95 and 115 seconds.

Once point F is reached, the incorporation of the silica filler in the polymer matrix is judged satisfactory; further ingredients are therefore introduced into the mixer. A residual amount of silica, equal to about 25% of the total amount, is preferably introduced in this phase.

The operation is carried out by raising the piston (F–G) and keeping it in this position throughout the time required ($t_5$): during this operation, the power absorption falls to very low values (G–H) and the temperature of the blend also falls, not only due to the removal of the piston pressure, but also because of the introduction of ingredients at room temperature, among which there may be included, in particular, liquid ingredients, such as the plasticizing oil, which promote this cooling.

Once the charging is complete, the piston is once again lowered and held pressed against the blend ($t_6$), resulting in a new peak (K) of power absorbed and a corresponding increase in temperature.

The total working time from the start of the cycle up to the point K, for silica-charged compounds, can be between 175 and 195 seconds.

Other (one or more) interventions are subsequently carried out on the direct process parameters, i.e. variations in the number of rotations of the rotors (for example two reductions of about 40% each) and/or movements of the pressing piston, with consequent peaks (J, M) of absorbed power, in combination with or separately from each other, of preset duration ($t_7$, $t_8$, $t_9$), in order to complete the dispersion and homogenization in the polymer matrix both of the silica and of the other newly needed ingredients.

It is considered that at the end of this processing phase, which extends from the start of the cycle to the end of the period $t_9$, indicated on the power curve by the peak M following the final lowering of the piston, optimum dispersion of the fillers in the polymer matrix has been achieved: this phase is referred to as the silicization phase.

At the end of this phase, in accordance with the invention, the temperature of the blend has reached its maximum value, of about 140° C., along a temperature profile which always remains within a range of preset values.

At this point, the said silanization phase begins, which occupies the entire subsequent period to the end of the cycle, during which the chemical silanization reaction between the silane, the silica and the polymer takes place.

In this phase, the pair of rotors rotates at low speed (preferably of about 5–10 rpm) in order to keep the temperature substantially constant; this is possible since, as the dispersion of the silica as well as of the other components in the polymer matrix has already been carried out, it is no longer necessary to put a large amount of mechanical work into the blend.

In accordance with the invention, the temperature parameter is kept at a substantially constant value between the values $T_1$, reached at the peak M, and $T_2$, at the end of the cycle, controlling the raising of the piston according to predetermined successive sequences ($t_{10}$, $t_{11}$, $t_{12}$, $t_{13}$), shown in the diagram in FIG. 2, between the peak values M and U of the power absorbed. In practice, the temperature is kept substantially constant by means of the heat stored in the previous phases, using the piston only to correct any changes in temperature away from the preset average value, in particular changes larger than the variation range allowed around the said average value. By way of example, suppose that at the end of the period $t_{11}$, the temperature is too close to the upper limit of the said variation range, in particular with a steeply rising gradient; the raising of the piston carried out at the end of period $t_{11}$ produces a sharp fall in the absorbed power (Q,R,S) which brings the temperature back within the preset limits.

The time for completion of the silanization from the start of the cycle (M) is between 252 and 278 seconds and the average duration of the silanization phase is about 225 seconds.

Finally, provision is made for discharging the blend.

The operation is carried out by opening the discharge outlet and increasing the number of revolutions of the pair of rotors, preferably returning it to the value at the start of the cycle. In this phase, the power absorbed shows a new peak value U which is immediately reduced after discharging the blend. The energy consumed on average by the entire working cycle described, given by curve "e" in FIG. 2, is about 0.12–0.15 kWh/kg of compound produced.

The blend removed from the mixer at a temperature of about 140° C. is converted into a sheet and cooled to room temperature, after which it is introduced into a closed batch mixer together with the crosslinking agent. This mixer can be the same mixer used for the previous phases or another mixer, referred to hereinbelow as the second mixer, to distinguish it from the one already mentioned above, for the purpose of greater clarity.

In the second mixer, the mixing phase required to disperse the vulcanizing system in the blend is carried out, taking care to keep the temperature below 110° C. so as not to initiate premature crosslinking phenomena. Checking of the temperature is also preferably carried out in this phase, as described previously, by means of movements of the piston optionally in combination with variations in the number of rotations of the rotors.

The processing of the material in the first mixer, i.e. the blend phase, in particular for silica-charged compounds, conditions the properties of the material (compound) obtained in the subsequent phases.

For the type of compound towards which the process of the invention is directed, the critical phases are those of silicization and silanization carried out during the processing of the blend in the first mixer. The subsequent phases carried out in the second mixer are substantially less critical in the process.

Advantageously, as is moreover clear from the diagram in FIG. 2, the simultaneous moment by moment observation, in the first mixer, of the main process parameters makes it possible to check whether or not they remain within a range of acceptability values predetermined at the start, as will be explained briefly.

In the case in which one of these parameters at any moment of the processing in the mixer is outside the acceptability range, the irregularity can be pointed out immediately and the necessary process modifications can be made to bring the given parameter back within the desired limits.

The acceptability range within which the process parameters can vary is set taking into account the characteristics of the ingredients used and the variability which can be accepted for a reference compound, as well as its specific end use.

Hereinbelow, the expression "reference compound" is intended to denote a compound whose physical and mechanical properties are such that, when the compound forms part of the final product, they determine the performance characteristics required for the said product, for example the performance characteristics of a tread band.

The properties of a "reference compound" comprise those of the blend leaving the first mixer, those of the raw compound removed from a second mixer, in which the blend leaving the first mixer has been mixed with the crosslinking system, and those of the vulcanized compound.

Among the most important properties of the blend removed from the first mixer are the viscosity and the percentage of silanization, among those of the raw compound leaving the second mixer are again the viscosity and the percentage of silanization, along with the rheometric properties, and among those of the vulcanized compound are the dispersion of the ingredients, the density, the hardness, the static and dynamic moduli and the tan-delta value.

It is assumed at this point that the process described above with the aid of FIGS. 1 and 2 is an initial cycle to define the process for producing a compound and it is desired to determine the acceptability range of the process parameters.

The process for determining this acceptability range is carried out as follows.

A large number of fillers, both for blends and for compounds, are produced several times, under conditions of uniformity of the starting materials and optimum efficiency of the systems and of the machinery, using the sample process.

The properties of the above product are measured and are compared with those for the blend and for the reference compound, respectively, and with the values of the process parameters used.

The limits within which each process parameter can vary in order to obtain product properties within the preset limits are determined by means of a statistical calculation method.

The quantitative limits between which the ingredients in the composition of a typical compound, which can be produced by the process according to the invention and the machine in FIG. 1, vary are given hereinbelow for purely indicative and non-limiting purposes.

The amounts of the ingredients are expressed as parts by weight per 100 parts (phr) of polymer material:

| | |
|---|---|
| Polymer base | 100 |
| Carbon black | 0–80 |
| Silica | 10–80 |
| Binder | 4%–15% of the silica |
| Zinc oxide (ZnO) | 1–3 |
| Stearic acid | 0–3 |
| Anti-deteriorating agents | 1–3 |
| Plasticizing oil | 0–30 |
| Anti-ozone wax | 0.5–3 |
| Specific chemical ingredients | 0–15 |

Among the polymer bases which are preferred are unsaturated-chain polymers or copolymers obtained by polymerization of conjugated dienes and/or vinylaliphatic or vinylaromatic monomers.

The polymer bases can be chosen more particularly from the group comprising: natural rubber, 1,4-cis-polybutadiene, polychloroprene, 1,4-cis-polyisoprene, optionally halogenated isoprene/isobutene copolymers, butadiene/acrylonitrile copolymers, styrene/butadiene copolymers and styrene/butadiene/isoprene terpolymers, obtained either in solution or in emulsion, ethylene/propylene/diene terpolymers and mixtures thereof.

The silica has a surface area, measured according to the BET method, preferably of between 100 and 300 m²/g; for example, the silica of the type VN3 sold by Degussa.

The silica-binding agents are silanes, and in particular the following can be used:

bis(2-triethoxysilylpropyl)tetrasulphide,
bis(3-trimethoxysilylpropyl)tetrasulphide,
bis(2-trimethoxysilylethyl)tetrasulphide.

The silane known commercially by the reference code Si 69, i.e. bis(3-triethoxysilylpropyl)tetrasulphane, sold by Degussa is preferably used.

A typical crosslinking system for silica-charged compounds is the one indicated below, expressed as parts by weight of the ingredients per 100 parts of polymer material:

| | |
|---|---|
| sulphur | 1–2 |
| diphenylguanidine (DPG) | 0.5–2 |
| sulphenamide (CBS) | 1–3 |

These particulars have been set out, a number of tables are now given, purely by way of example, in which the properties of a reference compound of defined composition and a further table relating to the acceptability ranges of the process parameter values are indicated.

More particularly, the tables relate to the following:

Table 1 indicates the values for the properties of the blend;

Table 2 indicates the values for the properties of the raw compound leaving the second mixer;

Table 3 indicates the values for the properties of the vulcanized compound;

Table 4 indicates the acceptability ranges for the values of the main process parameters to obtain products whose properties lie within the ranges of limit values set at the start.

These acceptability ranges are defined by the tolerance limits for deviation from the average value, which are given in the column headed with the symbol ±.

The tables relate to the processing, in the first mixer, of a 230 kg charge of material, which was optimized relative to the volume of the mixer and its density. The material introduced into the first mixer has a composition chosen from those given previously, in particular made up as specified below.

| FORMULATION | |
|---|---|
| SBR1712 | 75 |
| SBR1500 | 25 |
| Black 234 | 30 |
| Silica VN3 | 35 |
| Silane | 7 |
| Stearic acid | 2 |
| Wax | 1.5 |
| 6PPD | 1.5 |
| Styrene resin | 7.5 |
| Predispersed 80% zinc oxide | 3.125 |
| 95% sulphur | 1 |
| Sulphenamide TBBS | 1.5 |
| Retardant PVI | 0.2 |
| Predispersed 80% DPG80 diphenylguanidine | 1.25 |

TABLE 1

| Properties | Average value | Variability |
|---|---|---|
| Viscosity (ML 1 + 4 at 100° C.) | 125 | ±5% |
| % silane reacted with silica | 85 | ±3 |

The viscosity is measured in Mooney units by means of the methods described in ISO standard 289/1. The percentage of silane reacted with silica is determined using a known method of extraction with chemical solvents, carried out on test samples of the blend.

TABLE 2

| Properties | Average value | Variability |
|---|---|---|
| Viscosity (ML 1 + 4 at 100° C.) | 68 | ±5% |
| % silane reacted with silica | 88 | ±3 |
| Rheometric properties | | |
| $M_L$ (dN*m) | 2.3 | ±15% |
| $t_{10}$ (sec) | 1.3 | ±10% |
| $t_{30}$ (sec) | 2.0 | ±10% |
| $t_{60}$ (sec) | 2.8 | ±10% |
| $t_{90}$ (sec) | 4.2 | ±10% |
| $M_H$ (dN*m) | 15.6 | ±6% |

The rheometric properties are measured in this case according to ISO standard 6502, using an instrument of the MDR type at a temperature of 170° C.

The rheometric units $M_L$ and $M_H$ are expressed in dN*m (deciNewtons per meter) corresponding to the initial force and the maximum force exerted by a device oscillating in the test sample of compound heated to a given temperature.

The vulcanization curve initially shows a saddle where the minimum force occurs, roughly corresponding to the plastic state ($M_L$). The curve then rises again gradually up to a maximum constant value ($M_H$) corresponding to the level of vulcanization in which the instrument exerts the maximum force.

The properties indicated in Table 2 by the symbols $t_{XX}$ are expressed in seconds and each indicates the time required to reach the percentage XX of the difference between the maximum force and the minimum force.

Table 3 below indicates the properties of a test sample of the compound removed from the second mixer after vulcanization for 30' (minutes) at a temperature of 151° C.

TABLE 3

| Properties | | Average value | Variability |
|---|---|---|---|
| Density | (g/cm³) | 1.198 | ±0.003 |
| Modulus CA 0.5 | (MPa) | 1.5 | ±10% |
| Modulus CA 1 | (MPa) | 2.6 | ±10% |
| Modulus CA 3 | (MPa) | 11.0 | ±6% |
| Load at break | (MPa) | 20.2 | not <18.2 |
| Breaking elongation | (%) | 550 | not <490 |
| Hardness | (IRHD) | 73.5 | ±1.5 |
| E' at 23° C. | (100 Hz) | 10.3 | ±5% |
| E" at 23° C. | (100 Hz) | 3.4 | ±5% |
| tan-delta at 23° C. | (100 Hz) | 0.330 | ±10% |
| X dispersion | | >5 | |
| Y dispersion | | >9 | |

The density is measured by the process defined in ISO standard 2781.

The dynamometric properties are expressed by the moduli measured along the force/deformation curve plotted in a Cartesian diagram, with the forces expressed in MPa on the y-axis and the deformations on the x-axis.

The test methods are defined in ISO standard 37.

The symbols CA 0.5, 1 and 3 given in Table 3 indicate the value for the load measured at 50%, at 100% and at 300% deformation of the test sample, respectively.

The symbols E' and E" indicate the absolute values of the vectorial components of the complex modulus E*; more specifically, the first component relates to part of the stress imparted and stored by the material and then completely restored when the test sample returns to the normal state, and the second component relates to the other part of the stress absorbed by the compound and converted into unrecoverable heat energy.

Tan-delta represents the hysteresis index and its value is given by the ratio E"/E'.

The dispersion X is an index, well known in the art, which expresses the degree of dispersion of reinforcing fillers in the polymer base by means of a value chosen in a scale from 1 to 10: the higher value, the greater the uniformity of the dispersion.

The dispersion Y is an index, well known in the art, which indicates the presence and dimensions of the aggregates of reinforcing filler in the polymer base.

The importance of this factor is associated with the end use of the final product: for example, for tread compounds, good wear resistance can depend more on the absence of large-sized aggregates than on the uniformity of dispersion of the aggregates. The value of the dispersion Y is chosen in a scale from 1 to 10 in which, however, the higher the value, the smaller the size of the aggregates. The maximum value, equal to 10, indicates that there are no aggregates with an average diameter greater than 25 μm.

Table 4 below relates to the values of the main process parameters in the first mixer during the processing of a blend with the formulation mentioned above; Table 4 gives the acceptability ranges for the values of these parameters to obtain products with the properties given in Tables 1–3 above. In the Phase column, the moments taken into consideration are the most characteristic ones and are indicated by the same letter given in FIG. 2.

TABLE 4

| Phase | Time (sec) | ± | Temp. (° C.) | ± | Power (kW) | ± | Energy (kWh) | ± |
|---|---|---|---|---|---|---|---|---|
| C | 75 | ±10% | 75 | ±5 | 700 | ±15% | 9 | ±10% |
| F | 105 | ±10% | 90 | ±5 | 600 | ±15% | 12 | ±10% |
| K | 185 | ±5% | 110 | ±4 | 500 | ±15% | 14 | ±5% |
| J | 204 | ±5% | 120 | ±4 | 550 | ±15% | 20 | ±5% |
| M | 265 | ±5% | 135 | ±4 | 450 | ±15% | 24 | ±5% |
| Q | 380 | ±3% | 135 | ±3 | 170 | ±10% | 27 | ±3% |
| T | 490 | ±3% | 135 | ±3 | 150 | ±10% | 30 | ±3% |

The process has been described in relation to processing in a batch mixer with phases identified from the curves in the diagram of FIG. 2, although the processing process can be directed at compounds whose formulations may require processing times and temperatures different from those in FIG. 2; alternatively, the phases of silicization and silanization can be carried out in two separate periods, i.e. during a first processing in the mixer followed by discharging and preferably also cooling of the blend, and then, during a new processing operation of the blend again in the same or in a different closed mixer, before carrying out the final compound processing with incorporation of the vulcanizing system.

Irrespective of the solution adopted, the manufacturing process makes use of a system for archiving the starting data, such as, for example, those relating to the reference compound, and an operational management system for the entire compound manufacturing cycle. This archiving and management system is not described since it can be based on data management programs of known type. It is briefly mentioned here that the checking of the various process parameters involves the sending of measurement signals to a computer in which the signals are compared with predetermined values already in the memory. The computerized system then makes any corrections to the process parameters.

The process of the invention produces products with properties of high and predetermined uniformity.

To demonstrate this high product uniformity, the process according to the invention described above and identified by the values in Table 4 was compared with the process of the prior art, by carrying out with both the production of an identical compound in the same closed batch mixer. The properties to be achieved with both processes, both as regards the blend and as regards the final product, after vulcanization, were those given by the numerical values defined in Tables 1, 2 and 3.

The known process was based on systematically measuring the properties of the blend product and of the compound product, before and after vulcanization, but recording only the variations of the process parameters, and making the final selection of the acceptable products. In contrast, the process according to the invention was based on continuous analysis, moment by moment, of the main process parameters during the blend phase, automatically making the necessary corrections, in real time, when the value of these parameters began to move outside from the preset limits.

It was confirmed that the process according to the prior art appreciably lengthened the cycle time interval, the variation range of the processing temperature and the amount of energy consumed when compared with the process of the invention. In addition, the prior art process led to the manufacture of a certain number of blends which had to be rejected since, if introduced into the second mixer and then vulcanized, they would have given rise to compounds with properties outside the acceptability limits.

In particular, of the batches of compounds produced by the known process, 1% had to be rejected since they did not satisfy the preset properties, and the reason for which 30% of these batches were rejected was due to the process, whereas, with the process according to the invention, rejects due to the process were equal to zero.

Basically, the variability factor for the compounds obtained by the known process was substantially greater than that for the compounds obtained according to the invention. It can thus be reasonably asserted that the process according to the invention produces blends with better and reproducible uniformity than do the known processes. It is confirmed that the moment by moment monitoring of all the main parameters of the processing cycle constitutes an appreciable advantage, making it possible to correct any process anomalies in real time or, at least, to shut down the processing at a preliminary stage, thus avoiding the production of unacceptable blends and compounds, with a consequent saving of materials, time and energy consumed.

In addition, the variation over time of a given process parameter is always placed in relation to the variation of the other parameters, as a result of which, if the variation in the value of a given parameter, even if within the range of values deemed acceptable, were to give rise to a variation in the value of another parameter outside its acceptability range, this irregularity would be observed immediately and it would be possible to remedy it immediately by means of a suitable and predetermined correction of the direct process parameters.

In summary, with the process according to the invention, it is no longer necessary to carry out all the checks mentioned earlier on the final compound in order to have the guarantee of an acceptable product. In practice, the process according to the invention makes it possible, in situ and in real time, to correct one or more main process parameters should certain range values be exceeded, thus avoiding the production of irregular blends and compounds.

For example, there might be a lower temperature profile during the silanization phase, with prolongation of the duration of the cycle beyond acceptable limits.

The system corrects itself automatically on the basis of previously defined indications, for example increasing in this case the predetermined number of rotations of the rotors or the pressure of the piston, or both, with a consequent increase in the temperature, so as to discharge the material within the preset time, temperature and energy ranges.

It should also be noted that, according to the known art, it was necessary to systematically check the values of the moduli CA 0.5, CA 1 and CA 3 on the vulcanized product by attaching loads to suitable test samples and examining the deformations, all of which involved long tests, with possible variability over time of the results of these checks, with long waiting periods before authorizing the production of a fresh batch and/or the use of the material produced. Since the process according to the invention has defined the tolerance ranges of the main processing parameters, it has the advantage of avoiding the implementation of laborious analyses on the finished product or possible analyses on materials during processing in the batch device.

In practice, clearance is no longer given by examining all the properties of the final compound, but, rather, the process parameters and a very limited number of product characteristics, thereby successfully reducing the costs and at the same time improving the reliability of the results.

Controlling the main process parameters of the first phase rather than systematically checking the final compound advantageously reduces the costs and improves the reliability of the results.

This therefore demonstrates how moment by moment knowledge of the process parameters in the first mixer and their tolerability range makes it possible to reproduce over time the values of these parameters with the guarantee of obtaining subsequent cycles all carried out with a substantially equal energy consumption optimized at the start.

The energy consumption is thus preferably monitored moment by moment at the same time as the other parameters from the start of the working cycle up to the moment of discharge of the blend.

It is also clear that the invention is not limited strictly to the description given above, but rather that any alternative approach or solution is also considered as being included, even if it is not specifically described, but can nevertheless be readily deduced for any person skilled in the art on the basis of the present inventive solution.

For example, the process is also valid when the processing phases are carried out in a batch device with a pair of intermeshing rotors.

What is claimed is:

1. A process for manufacturing a tyre compound, wherein the compound comprises at least the following ingredients:
    a polymer base;
    a silica reinforcing filler;
    a silica-binding agent; and
    further product and process additives;
wherein the process comprises:
    combining the ingredients to produce a blend; and
    combining the blend with a crosslinking system to produce the compound;
wherein combining the ingredients to produce the blend is carried out in a closed mixer comprising a piston and a pair of rotors,
wherein, during a manufacturing cycle, values of at least two indirect parameters are checked at least every two minutes,
wherein the at least two indirect parameters comprise blend temperature and power absorbed by the rotors,
wherein at least two direct parameters comprise pressure exerted by the piston and rotations of the rotors,
wherein the at least two indirect parameters are maintained within respective ranges of predetermined values by controlling one or more of the at least two direct parameters, and
wherein combining the ingredients to produce the blend comprises a silicization phase followed by a silanization phase.

2. The process of claim 1, wherein the blend temperature substantially increases during the silicization phase.

3. The process of claim 1, wherein the blend temperature substantially increases during the silicization phase due to at least three peaks of supplied power.

4. The process of claim 3, wherein the at least three peaks of supplied power are obtained by lowering the piston toward the rotors.

5. The process of claim 1, wherein the blend temperature is substantially constant during the silanization phase.

6. The process of claim 1, wherein the blend temperature substantially increases during the silicization phase, and
    wherein the blend temperature is substantially constant during the silanization phase.

7. The process of claim 6, wherein the blend temperature substantially increases during the silicization phase due to at least three peaks of supplied power.

8. The process of claim 7, wherein the at least three peaks of supplied power are obtained by lowering the piston toward the rotors.

9. The process of claim 1, wherein a rotation speed of the rotors during the silanization phase is substantially constant.

10. The process of claim 1, wherein the silicization phase comprises at least three cycles carried out at different rotation speeds of the rotors, and
    wherein the rotation speeds of the rotors gradually decrease.

11. The process of claim 1, wherein during a manufacturing cycle, the values of the at least two indirect parameters are checked at least every thirty seconds.

12. The process of claim 1, wherein during a manufacturing cycle, the values of the at least two indirect parameters are checked at least every fifteen seconds.

13. The process of claim 1, wherein during a manufacturing cycle, the values of the at least two indirect parameters are checked more than once per second.

14. The process of claim 1, wherein the ingredients comprise, per one hundred parts-by-weight (phr) of the polymer base:

| | |
|---|---|
| the polymer base | 100 phr; |
| the silica reinforcing filler | 10–80 phr; and |
| the silica-binding agent | 4%–15% of the silica. |

15. The process of claim 14, wherein the respective range of values are predetermined for each specific compound to be manufactured.

16. The process of claim 14, wherein the respective range of values are predetermined for each specific compound to be manufactured by:

a) determining, for a specific reference compound, average values and related variability ranges for a plurality of properties of a blend of the specific reference compound, a composition of the specific reference compound before vulcanization, and a composition of the specific reference compound after vulcanization;

b) producing a sample using selected initial process parameters;

c) determining, for the sample, values for a plurality of properties of a blend of the sample, a composition of the sample before vulcanization, and a composition of the sample after vulcanization;

d) comparing corresponding values of the plurality of properties of the specific reference compound and the sample;

e) modifying at least one of the selected initial indirect parameters related to one or more sample values that may be outside of corresponding average values and related variability ranges of the specific reference compound;

f) repeating b), c), d), and e) until all sample values are inside of the corresponding average values and related variability ranges of the specific reference compound; and g) setting, as the respective ranges of predetermined values of the at least two indirect parameters for each specific compound to be manufactured, average values of the initial indirect parameters and related variability ranges of the initial indirect parameters that result in all sample values being inside of the corresponding average values and related variability ranges of the specific reference compound.

17. The process of claim 16, the plurality of properties of the blend of the sample comprises viscosity and a percentage of silica-binding agent reacted with silica reinforcing filler.

18. The process of claim 17, wherein the plurality of properties of the blend of the sample are determined in an absence of a crosslinking system.

19. The process of claim 16, wherein the plurality of properties of the composition of the sample before vulcanization comprises viscosity, a percentage of silica-binding agent reacted with silica reinforcing filler, and rheometric properties.

20. The process of claim 16, wherein the plurality of properties of the composition of the sample after vulcanization comprises density, hardness, modulus of elasticity, breaking load, and elongation.

21. The process of claim 1, wherein the ingredients comprise, per one hundred parts-by-weight (phr) of the polymer base:

| | |
|---|---|
| the polymer base | 100 phr; |
| the silica reinforcing filler | 40–80 phr; and |
| the silica-binding agent | 4%–15% of the silica. |

22. The process of claim 1, wherein the ingredients comprise, per one hundred parts-by-weight (phr) of the polymer base:

| | |
|---|---|
| the polymer base | 100 phr; |
| carbon black | 0–80 |
| the silica reinforcing filler | 10–80 phr; |
| the silica-binding agent | 4%–15% of the silica; |
| zinc oxide (ZnO) | 1–3 phr; |
| stearic acid | 0–3 phr; |
| anti-deteriorating agents | 1–3 phr; |
| plasticizing oil | 0–30 phr; |
| anti-ozone wax | 0.5–3 phr; and |
| specific chemical ingredients | 0–15 phr. |

23. The process of claim 22, wherein the respective ranges of values are predetermined for each specific compound to be manufactured.

24. The process of claim 22, wherein the respective ranges of values are predetermined for each specific compound to be manufactured by:

a) determining, for a specific reference compound, average values and related variability ranges for a plurality of properties of a blend of the specific reference compound, a composition of the specific reference compound before vulcanization, and a composition of the specific reference compound after vulcanization;

b) producing a sample using selected initial process parameters;

c) determining, for the sample, values for a plurality of properties of a blend of the sample, a composition of the sample before vulcanization, and a composition of the sample after vulcanization;

d) comparing corresponding values of the plurality of properties of the specific reference compound and the sample;

e) modifying at least one of the selected initial indirect parameters related to one or more sample values that may be outside of corresponding average values and related variability ranges of the specific reference compound;

f) repeating b), c), d), and e) until all sample values are inside of the corresponding average values and related variability ranges of the specific reference compound; and g) setting, as the respective ranges of predetermined values of the at least two indirect parameters for each specific compound to be manufactured, average values of the initial indirect parameters and related variability ranges of the initial indirect parameters that result in all sample values being inside of the corresponding average values and related variability ranges of the specific reference compound.

25. The process of claim 24, wherein the plurality of properties of the blend of the sample comprises viscosity and a percentage of silica-binding agent reacted with silica reinforcing filler.

26. The process of claim 25, wherein the plurality of properties of the blend of the sample are determined in an absence of a crosslinking system.

27. The process of claim 24, wherein the plurality of properties of the composition of the sample before vulcanization comprises viscosity, a percentage of silica-binding agent reacted with silica reinforcing filler, and rheometric properties.

28. The process of claim 24, wherein the plurality of properties of the composition of the sample after vulcanization comprises density, hardness, modulus of elasticity, breaking load, and elongation.

\* \* \* \* \*

UNITED STATES PATENT AND TRADEMARK OFFICE
CERTIFICATE OF CORRECTION

PATENT NO. : 6,864,310 B2
DATED : March 8, 2005
INVENTOR(S) : Gianluigi Hotellier et al.

It is certified that error appears in the above-identified patent and that said Letters Patent is hereby corrected as shown below:

Column 19,
Line 34, "claim 16, the" should read -- claim 16, wherein the --.
Line 65, "0-80" should read -- 0-80 phr; --.

Signed and Sealed this

Thirty-first Day of May, 2005

JON W. DUDAS
*Director of the United States Patent and Trademark Office*